United States Patent

Shigeo

Patent Number: 5,212,006
Date of Patent: May 18, 1993

[54] HIGH DENSITY MAGNETIC RECORDING MEDIUM

[75] Inventor: Utsumi Shigeo, Yokohama, Japan

[73] Assignee: Diafoil Company, Ltd., Tokyo, Japan

[21] Appl. No.: 815,113

[22] Filed: Dec. 27, 1991

[30] Foreign Application Priority Data

Dec. 28, 1990 [JP] Japan .................. 2-408809

[51] Int. Cl.$^5$ ............................................. B32B 27/00
[52] U.S. Cl. ................................... 428/141; 428/143; 428/213; 428/480; 428/694 BB
[58] Field of Search ............... 428/480, 141, 694, 143, 428/213; 427/131

[56] References Cited

U.S. PATENT DOCUMENTS

| | | | |
|---|---|---|---|
| 4,568,599 | 2/1986 | Ono et al. | 428/480 |
| 4,798,759 | 1/1989 | Dallman et al. | 428/480 |
| 5,047,278 | 9/1991 | Ono et al. | 428/480 |
| 5,069,962 | 12/1991 | Okazaki et al. | 428/480 |

Primary Examiner—Paul J. Thibodeau
Assistant Examiner—D. S. Nakarani
Attorney, Agent, or Firm—David G. Conlin

[57] ABSTRACT

A novel high density magnetic recording medium is disclosed. Said medium comprises a polyester film formed of a plurality of layers laminated by coextrusion and oriented by stretching, which simultaneously satisfies the conditions of the following relations (1) to (4); a back coat layer which is provided on the rougher surface side of said polyester film layer and whose surface roughness simultaneously satisfies the conditions of the following relations (5) and (6); and a magnetic film layer provided on the less rough surface side of said polyester film.

$$Ra^A \leq 0.008 \quad (1)$$

$$0.005 \leq Ra^B \leq 0.02 \quad (2)$$

$$0.005 \leq Ra^B - Ra^A \leq 0.015 \quad (3)$$

$$9 \leq F_5 \leq 30 \quad (4)$$

$$0.015 \leq Ra^C \leq 0.040 \quad (5)$$

$$0.003 \leq Ra^C - Ra^B \leq 0.35 \quad (6)$$

wherein
$Ra^A$ stands for centerline average roughness (μm) of the less rough surface side of the polyester film;
$Ra^B$ stands for centerline average roughness (μm) of the rougher surface side of the polyester film;
$Ra^C$ stands for centerline average roughness (μm) of the surface of the back coat layer; and
$F_5$ stands for the tensile strength in kilograms per square millimeter at 5% elongation in the longitudinal direction of the polyester film.

7 Claims, No Drawings

HIGH DENSITY MAGNETIC RECORDING MEDIUM

FIELD OF THE INVENTION

The present invention relates to a high density magnetic recording medium. More specifically, a thin film magnetic recording medium having excellent electromagnetic conversion properties and running durability.

BACKGROUND OF THE INVENTION

Recently, there are known high density magnetic recording media, which comprise a non-magnetic supporting substrate and a magnetic recording layer of a thin metal film formed thereon by means of vacuum deposition such as vacuum evaporation or sputtering or ion plating.

It is considered that metal films formed by a thin film-forming technique such as vacuum evaporation, sputtering, ion plating, etc. have a defect that the surface condition (unevenness) of the non-magnetic substrate appears on the surface of the magnetic layer as its own unevenness because of the thinness thereof, which causes degradation of electromagnetic conversion characteristics. From the viewpoint of electromagnetic conversion characteristics, it is desirable that the surface of non-magnetic substrate is as smooth as possible. However, there is a problem that smoothness of the substrate makes winding and unwinding of the medium difficult, makes poor the slipperiness between film and film and film and roll and is liable to cause defects such as scratch on the surface of the medium.

There have been made various attempts to make magnetic recording media which simultaneously satisfy the two above-described contradictory properties.

For instance, it was proposed to form, in the production line, a slip agent layer on at least one surface of a very smooth film and thus obtain a substrate, one of the surfaces of which is smooth and the other surface is slippery, and to form a magnetic layer on the smooth surface thereof. This method was not practical because defects such as flaw, etc. were caused during the casting and longitudinal stretching and thus the yield was poor.

Also it was proposed to form a laminated film of a smooth film and a slippery film by means of co-extrusion and further coat the slippery surface with a slip agent (Laid-Open Patent Publication No. 58-153640). Formation of a coating layer degrades the yield of the product. Therefore, a method which does not involve such coating procedure has been desired.

We conducted an extensive study in consideration of the above-described problems and found that an excellent magnetic recording medium can be obtained by employing a specific combination of layers and thus completed the present invention.

SUMMARY OF THE INVENTION

The gist of the present invention resides in a high density magnetic recording medium comprising a polyester film formed of a plurality of layers laminated by coextrusion and oriented by stretching, which simultaneously satisfies the conditions of the following relations (1) to (4); a back coat layer which is provided on the rougher surface side of said polyester film layer and whose surface roughness simultaneously satisfies the conditions of the following relations (5) and (6); and a magnetic film layer provided on the less rough surface of said polyester film.

$$Ra^A \leq 0.008 \tag{1}$$

$$0.005 \leq Ra^B \leq 0.02 \tag{2}$$

$$0.005 \leq Ra^B - Ra^A \leq 0.015 \tag{3}$$

$$9 \leq F_5 \leq 30 \tag{4}$$

$$0.015 \leq Ra^C \leq 0.040 \tag{5}$$

$$0.003 \leq Ra^C - Ra^B \leq 0.035 \tag{6}$$

wherein
$Ra^A$ stands for the average centerline roughness ($\mu$m) of the less rough surface side of the polyester film;
$Ra^B$ stands for the average centerline roughness ($\mu$m) of the rougher surface of the polyester film;
$Ra^C$ stands for the average centerline roughness ($\mu$m) of the surface of the back coat layer; and
$F_5$ stands for the tensile strength in kilograms per square millimeter at 5% elongation in the longitudinal direction of the polyester film.

The invention will now be described specifically in detail.

In the present, invention, the word "polyester" means a polyester made by polycondensation of an aromatic dicarboxylic acid such as terephthalic acid, naphthalene-2,6-dicarboxylic acid, etc. and an aliphatic glycol such as ethylene glycol, diethylene glycol, tetramethylene glycol, neopentyl glycol, etc. Typical examples of such polyester are poly(ethylene terephthalate)(PET), poly(ethylene-2,6-naphthalenedicarboxylate) (PEN), etc. The polyester includes copolymers which are produced by copolymerizing an aromatic or aliphatic dicarboxylic acid, a diol, etc. in an amount that does not reduce crystallinity of the polymer, that is, not more than 10 mol %.

Other polymers such as polyamide, polyolefin, polycarbonate, etc. can be blended. However, polymers which excessively reduce crystallinity or increase surface roughness when blended are undesirable.

It is desirable to laminate different kinds of polymers. For instance, a combination of PET and PEN or other polymers, a combination of the same kind of polymers having different intrinsic viscosities, etc. can be selected in accordance with the intended object. The polyester can contain ester exchange catalysts, polymerization catalysts, etc. as well as stabilizers such as phosphoric acid, phosphorous acid and esters thereof, UV absorbers, matting agents or lubricants such as titanium dioxide, fine particles of silica, kaolin, calcium carbonate, etc. as desired.

One surface of the polyester film used in the present invention which is exposed (A surface) comprises a polyester layer which may contain fine particles, which will give a smooth surface having an average centerline surface roughness ($Ra^A$) of not more than 0.008 $\mu$m after stretched and heat-set. The other exposed surface (B surface) comprises a polyester film containing fine particles which give an average centerline surface roughness ($Ra^B$) of 0.005–0.020 $\mu$m to the polyester film. These films are formed into a laminate by putting together the two materials immediately before being fed into the extrusion die or in said die. The A surface is to be provided with a magnetic layer and, therefore, it is improper that the $Ra^A$ of this surface is in excess of 0.008

μm, because the intended electromagnetic conversion properties are not achieved. The $Ra^A$ of the A surface should preferably be not more than 0.006 μm and more preferably not more than 0.005 μm.

The A surface can, in the production line, be coated with a layer which improves adhesion of the metal layer and slipperiness. However, usually such coating is not effected in consideration of productivity.

If the $Ra^B$ of the B surface is less than 0.005 μm, the running property of the film is inferior. If the $Ra^B$ is in excess of 0.020 μm, it does not improve the running property but rather deteriorates adhesiveness.

The surface protrusions of the layer which constitutes the B surface (B layer) may influence the smooth surface of the layer which constitutes the A surface (A layer) causing increase in $Ra^A$ with unevenness of longer intervals than when only the A layer is made depending on the ratio f the thicknesses of the A layer and the B layer and the surface roughnesses of the two layers. Or a suitable minute irregularity may be formed by selecting conditions of heat treatment, relaxing, stretching, etc. In either case, it is all right if the two surfaces of the substrate film satisfy the above-described conditions. However, it is desirable that the substrate film is free from long interval unevenness or undulation. For this purpose, the thickness of the B layer should be not more than ½ of the total thickness, preferably not more than ⅓ and more preferably not more than ¼ of the total thickness.

In the present invention, particles to be used for the A layer should preferably be very fine. Preferable examples of resins containing very fine particles are polyesters containing the residue of catalysts of calcium compounds, lithium compounds, phosphorus compounds, etc. formed during the polymerization, polyesters containing fine inorganic particles of not more than 200 μm such as ultrafine silica, etc. Also, blends of two or more polyesters prepared by polymerization with addition of different amounts of phosphorus compounds and/or other additives can be used.

The time to incorporate the inert inorganic particles in the polyester is either prior to polymerization or during polymerization. It is also possible to add the particles and knead when the prepared resin is pelletized or when it is extruded into a sheet form in the fused condition in an extruder. However, addition prior to polymerization is preferred.

Preferable examples of polyester resins which do not contain particles are polyesters which are prepared using ester exchange catalysts such as magnesium compounds, manganese compounds, zinc compounds, etc. and preventing precipitation of the catalyst residue by means of phosphorus compounds. Preferred polymerization catalysts are antimony compounds, germanium compounds, titanium compounds, tin compounds, etc. The resin which is prepared by polymerization with a reduced amount of antimony catalysts is most preferable although, of course, not limited thereto.

Any known particles can be used for the B layer although hard fine particles such as fine particles of aluminum oxide are especially preferred.

The difference between the surface roughnesses of the A layer and the B layer ($Ra^B - Ra^A$) of the polyester film used in the present invention should be within a range of 0.005–0.015 μm. When the difference is less than 0.005 μm, the running property of the film is not well maintained and, therefore, it is not desirable. On the other hand, when the difference is in excess of 0.0.5 μm, contact to the cooling drum is unsatisfactory. The preferred range of the difference of Ra's is 0.007–0.010 μm.

In order to prevent the influence of the surface condition of the B layer on the A layer, it is preferable to employ conditions, under which recesses are formed around the protrusions on the surface of the B layer and thus the protrusions are sunken in the recesses, when the polyester film is stretched.

As described above, the substrate film used in the present invention has different surface roughnesses on its two sides and the difference thereof falls within a specified range. At the same time, the tensile strength of the film when longitudinally stretched by 5% ($F_5$) should be within a range of 9–30 kg/mm², preferably 18–30 kg/mm². The film, whose $F_5$ is less than 9 kg/mm², is susceptible to the so-called edge damage, which means a problem that the side edges of a magnetic tape, which contact the flanges of the guide pins, deform like the edges of a kelp when it is used repeatedly. This problem can be avoided by making the Young's modulus of the film both in the longitudinal and transversal directions not less than 600 kg/mm², preferably not less than 800 kg/mm². This kind of high strength films can be obtained by using poly(ethylene naphthalate) rather than poly(ethylene terephthalate).

A magnetic thin film layer is formed on the A surface of the polyester film in accordance with the present invention by any known method for forming thin magnetic films. Vacuum evaporation, ion plating, sputtering and electroless plating are preferred.

Vacuum evaporation is carried out by heating the metal to be deposited in a tungsten boat or an alumina hearth under a vacuum of $10^{-4}$–$10^{-6}$ Torr. by means of ohmic heating, high frequency heating, electron beam heating, etc. and letting the vapor deposit on the surface of the substrate. Usually iron (Fe), nickel (Ni), cobalt (Co) or alloys thereof are used for the formation of thin magnetic films. The present invention includes the reaction deposition wherein iron is evaporated and deposited in an oxygen ($O_2$) atmosphere. The ion plating method is carried out by evaporating a metal in an atmosphere comprising an inert gas under a vacuum of $10^{-4}$–$10^{-3}$ Torr. by DC glow discharge or RF glow discharge. Usually argon (Ar) is used as an inert gas. The sputtering method is carried out by forming Ar ions in an atmosphere comprising Ar by means of glow discharge bombarding the formed ions onto the surface of the target metal so as to hit the atoms on the surface of the target to expel them. DC dipolar sputtering, DC tripolar sputtering and high frequency sputtering can be employed. Magnetron sputtering utilizing a magnetron is also employable. By electroless plating, Co-P or Co-Ni-P plating can be effected.

The thickness of the thin magnetic layer formed in accordance with the present invention must be sufficient enough to be able to produce sufficient signal output as a high density magnetic recording medium. Thus the thickness should preferably be in the range of 0.02–1.5 μm (200–15000 Å).

Thin magnetic films for long recording media such as magnetic tapes for audio, video and computer can be formed by vapor deposition (deposition by heating, electron beam deposition, etc.) sputtering (DC dipolar sputtering, high frequency sputtering, etc.). In the case of vapor deposition, crystalline magnetic anisotropy and form anisotropy are manifested in the horizontal direction of the film by continuous oblique-incidence growth deposition of a ferromagnetic metal such as cobalt (Co), etc. and repetition of deposition to form a laminate so as to form an axis of easy magnetization in the horizontal direction of a magnetic tape. Therefore, the total thickness of the thin metal film is preferably in the range of 0.02–0.05 μm (200–5000 Å). Apart from the above described long recording media such as those for audio, video, computer, etc., PCM and flexible discs which are capable of high density digital recording can be prepared in accordance with the present invention by making an axis of easy magnetization appear in the vertical direction by suppressing generation of a demagnetization field by addition of a suitable amount (10–20%) of chromium (Cr) to Co and thus enables perpendicular magnetic recording, wherein recording is effected in the direction vertical to the substrate surface. Usually a Co-Cr alloy is used in sputtering. In this case, a magnetic flux converging thin film of a high magnetic permeability material such as a Permaloy (Fe-Ni) or Supermalloy can be provided between the nonmagnetic substrate and the magnetic recording medium having an axis of easy magnetization in the vertical direction. A thin film of the high magnetic permeability material as a magnetic flux converging material can be formed by sputtering. The thickness thereof is 0.1–1 μm (1000–10000 Å) and has a coercive force of as low as not more than 500 Oe. In this case, the thickness of the Co-Cr thin film of the magnetic recording layer should preferably be in the range of 0.2–1.5 μm (2000–15000 Å).

A back coat is formed on the opposite side of the surface coated by the deposition. The back coat can be formed prior to deposition of the magnetic thin film, although post-deposition coating is preferred in consideration of deposits.

The surface roughness of the thus formed back coat ($Ra^C$) is in the range of 0.015–0.040 μm, preferably in the range of 0.020–0.035 μm, more preferably 0.025–0.035 μm. If the $Ra^C$ is less than 0.015 μm, the running property is inferior as a magnetic recording medium. If the $Ra^C$ is in excess of 0.040 μm, the evenness of the back coat is poor.

The difference of the $Ra^C$ of the thus formed back coat and the $Ra^B$ of the B surface ($Ra^C-Ra^B$) is in the range of 0.003–0.035 μm, preferably in the range of 0.008–0.035 μm. If the difference of the Ra's is less than 0.003 μm, the roughness of the B surface influences the roughness of the back coat layer and thus the evenness of the protrusions is impaired and running property degrades. On the other hand, the difference of the Ra's is in excess of 0.035 μm, the protrusions of the back coat are irregular and the running durability deteriorates.

DETAILED DESCRIPTION OF THE PREFERRED EMBODIMENTS

Now the invention will be described in detail by way of working and comparative examples but the invention is not limited to modes of these working examples.

The properties of the formed film and the magnetic recording media were evaluated by the following methods.

(1) Average surface roughness (Ra)

Ra was measured using a surface roughness tester (SE-3FK) marketed by Kabushiki Kaisha Kosaka Kenkyusho. The radius of curvature of the probe stylus tip was 2 μm and the load was 30 mg. The surface was scanned longitudinally and transversally. A 2.5 mm (=L) portion was taken from the measured section curve of the film in the direction of the center line. The data of this portion was plotted on an coordinate plane with the abscissa (X) of the center line and the ordinate (Y) of multiplied thickness and a roughness curve y=f(x) was obtained. Ra was given by the following formula in μm. The cut-off value was 80 μm. The Ra was given as an average of values at 5 points in the longitudinal direction and 5 points in the transversal direction.

$$1/L \int_0^L |f(x)|dx$$

(2) $F_5$ value

A sample film piece ½ inch in width and 50 mm in length (distance between the chucks) was pulled by a Tensilon tester (UTM-111) marketed by Toyo Board Co. at a rate of 50 mm/min. at 20° C. and 65% RH. The load at the 5% elongation was divided by the initial cross-sectional area and the quotient was represented in kg/mm².

(3) Electromagnetic conversion property

A magnetic recording tape made from the magnetic recording medium prepared in accordance with the present invention was mounted on a recording apparatus available on the market and the initial output of the head of said recording apparatus was measured.

(4) Durability

A magnetic recording tape was passed through a recording apparatus 100 times and appearance of kelp-like edge was observed by naked eye.

EXAMPLE 1

A poly(ethylene terephthalate) containing little internally deposited particles and 0.3wt % of delta-$Al_2O_3$ particles having a specific surface area of 80–100 m²/g was used for an A layer ($A_1$) and a poly(ethylene terephthalate) stock containing 0.3 wt % of said delta-$Al_2O_3$ particles and 0.08 wt % of synthesized monodipersed calcium carbonate particles having a particle size of 0.6 μm was used for a B layer ($B_1$). These two materials were co-extruded so that they were laminated at a thickness ratio of 5($A_1$):1($B_1$). The laminated sheet was longitudinally stretched by a factor of 3.3 at a temperature of 85°–90° C. and then transversely stretched by a tenter by a factor of 3.5 at a temperature of 95°–100° C. A 9 μm thick film was obtained after the heat-setting at 215° C.

The yield of manufacture of the film was as good as that in the manufacture of films for coated type metal tapes (MP). The properties of the obtained film are shown in the following Table 1. The thus obtained film had good slipperiness, was free from blocking and could be smoothly wound up.

On the $A_1$ surface of this polyester film, a thin (1500 Å) film of a cobalt-iron alloy was formed by vacuum evaporation. Then a protective layer having a thickness of 0.1 μm comprising an epoxy resin, silicone and a silane coupler was formed on the alloy surface and a back coat layer was formed on the $B_1$ surface. The thus prepared film was slitted into magnetic recording tapes having a predetermined width.

The obtained tapes were free from flaws, excellent in dropout, S/N ratio, running property as recording tape and durability. This was very excellent as a high density magnetic recording medium.

COMPARATIVE EXAMPLE 1

A magnetic recording medium was prepared in the same manner as in Example 1 except that the substrate was made of a single layer so that both sides of the tape had the same roughness as the roughness of the $A_1$ surface. This film was difficult in winding, flaws occurred frequently, the yield was very low and thus commercial scale production was impossible.

COMPARATIVE EXAMPLE 2

A magnetic recording medium was prepared in the same manner as in Example 1 except that the prepared substrate was coated in the production line before the longitudinal stretching and tentering but the back coat layer was not formed. The thus obtained magnetic recording tape was tested on a recording apparatus available on the market. When passed through on the apparatus many times, the coating layer suffered damage and was not good for use. Also in the coating treatment, coating defect occurred and thus the productivity was poor.

EXAMPLE 2

An unstretched film was prepared in the same manner as in Example 1 except that poly(ethylene 2,6-naphthalate) was used instead of poly(ethylene terephthalate). The obtained film was longitudinally stretched by a factor of 4.5 at 135° C. and tentered by a factor of 4.3 at 150° C. and then further longitudinally stretched by a factor of 1.2 at 140° C. and tentered again by a factor of 1.15 at 200° C. and heat-set at 225° C. Thus a 5 μm thick a film was obtained. The physical properties of the obtained film are indicated in the following Table 1. The obtained film was made into a magnetic recording medium by forming a metal layer by vacuum deposition on the smooth side and forming a back coat layer on the other side by vacuum deposition in the same manner as in Example 1. The obtained product was good in both electromagnetic conversion properties and running properties and stood long time recording.

TABLE 1

| | Ex. 1 | Comp. Ex. 2 | Comp. Ex. 2 | Ex. 1 |
|---|---|---|---|---|
| $Ra^A$(μm) | 0.004 | 0.004 | 0.004 | 0.003 |
| $Ra^B-Ra^A$(μm) | 0.009 | 0 | 0.009 | 0.008 |
| $F_5$(kg/mm$^2$) | 10.4 | 10.4 | 10.4 | 20.2 |
| Young's modulus | | | | |
| MD | | | | 842 |
| TD | | | | 812 |
| $Ra^C$ | 0.031 | 0.031 | 0.011 | 0.031 |
| $Ra^C-Ra^B$(μm) | 0.018 | 0.027 | 0.002 | 0.030 |

The magnetic recording medium of the present invention has excellent electromagnetic conversion properties and running durability and thus is commercially very valuable.

I claim:

1. A high density magnetic recording medium comprising a polyester film formed of a plurality of layers laminated by coextrusion and oriented by stretching, said plurality of layers including a first outer layer forming a rougher surface side of said polyester film and a second outer layer forming a less rough surface on an opposite side of said polyester film, said polyester film satisfying the conditions of the following relations (1) to (4); a back coat layer which is provided on the rougher surface side of said polyester film layer and whose surface roughness simultaneously satisfies the conditions of the following relations (5) and (6); and a magnetic film layer provided on the less rough surface of said polyester film;

the following relations being as follows:

$Ra^A \leq 0.008$ (1)

$0.005 \leq Ra^B \leq 0.02$ (2)

$0.005 \leq Ra^B - Ra^A \leq 0.015$ (3)

$9 \leq F_5 \leq 30$ (4)

$0.015 \leq Ra^C \leq 0.040$ (5)

$0.003 \leq Ra^C - Ra^B \leq 0.035$ (6)

wherein $Ra^A$ stands for the average centerline roughness (μm) of the less rough surface side of the polyester film;

$Ra^B$ stands for the average centerline roughness (μm) of the rougher surface of the polyester film;

$Ra^C$ stands for the average centerline roughness (μm) of the surface of the back coat layer; and $F_5$ stands for the tensile strength in kilograms per square millimeter at 5% elongation in the longitudinal direction of the polyester film.

2. The magnetic recording medium as claimed in claim 1, wherein said following relations are more particularly defined as follows:

$Ra^A \leq 0.008$ (1)

$0.005 \leq Ra^B \leq 0.02$ (2)

$0.007 \leq Ra^B - Ra^A \leq 0.010$ (3)

$14 \leq F_5 \leq 30$ (4)

$0.015 \leq Ra^C \leq 0.040$ (5)

$0.003 \leq Ra^C - Ra^B \leq 0.035$ (6).

3. The magnetic recording medium as claimed in claim 2, wherein said following relations are more particularly defined as follows:

$Ra^A \leq 0.005$ (1)

$0.005 \leq Ra^B \leq 0.02$ (2)

$0.007 \leq Ra^B - Ra^A \leq 0.010$ (3)

$18 \leq F_5 \leq 30$ (4)

$0.015 \leq Ra^C \leq 0.040$ (5)

$0.003 \leq Ra^C - Ra^B \leq 0.035$ (6).

4. The magnetic recording medium as claimed in claim 1, wherein the substrate polyester film comprises two polyester films, one of which forms the less rough surface and has a surface roughness of not more than 0.008 μm and contains no particles which cause the film to exceed a surface roughness of not more than 0.008 μm and the other film forms the rougher surface and has a surface roughness of 0.005–0.020 μm.

5. The magnetic recording medium as claimed in claim 4, wherein the thickness of the rougher surface layer is not more than ½ of the total thickness of the polyester film.

6. The magnetic recording medium as claimed in claim 5, wherein the thickness of the rougher surface layer is not more than ⅓ of the total thickness of the polyester film.

7. The magnetic recording medium as claimed in claim 6, wherein the thickness of the rougher surface layer is not more than ¼ of the total thickness of the polyester film.

* * * * *